Jan. 18, 1955   M. B. HERSCHER   2,699,568
SAFETY LATCH
Filed Dec. 22, 1949
Fig.1.
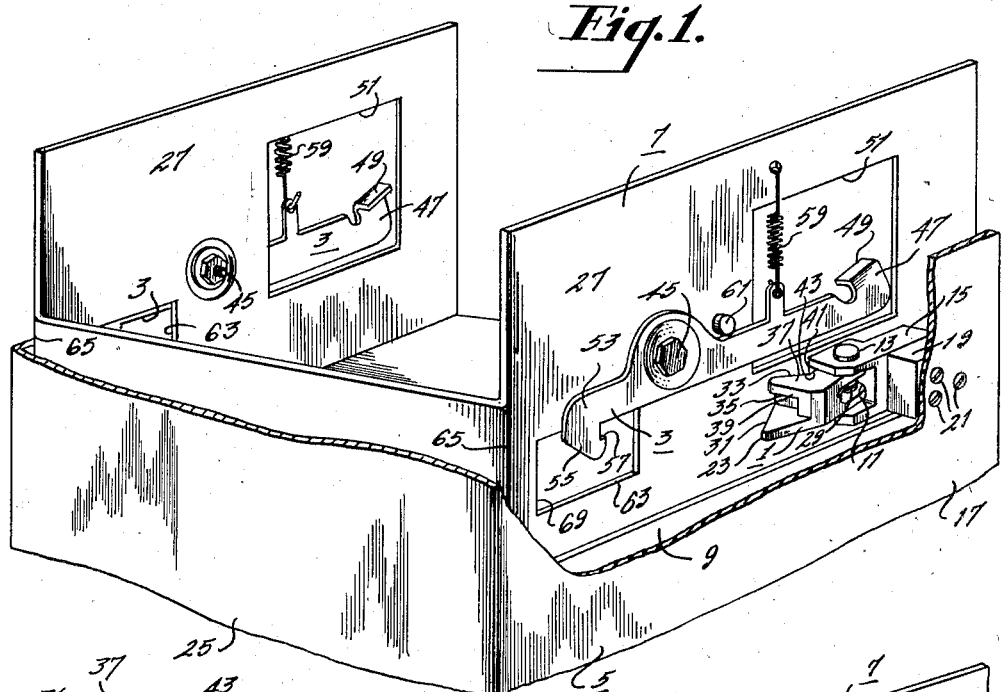
Fig.4
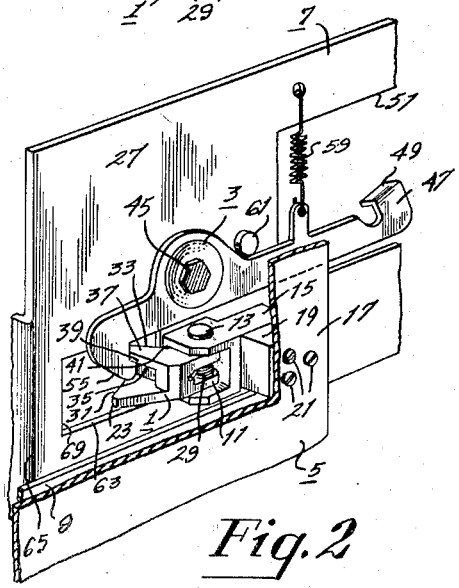
Fig.2
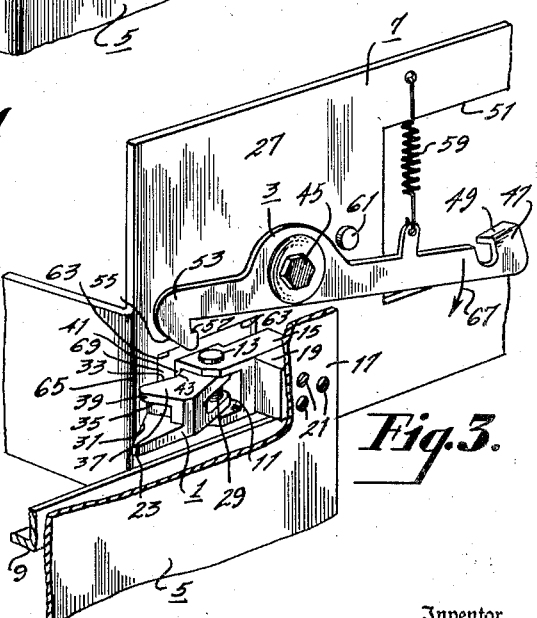
Fig.3.
Inventor
Marcus B. Herscher
Morris B. Rabin
Attorney United States Patent Office 2,699,568
Patented Jan. 18, 1955

2,699,568

SAFETY LATCH

Marcus B. Herscher, Camden, N. J., assignor, by mesne assignments, to the United States of America as represented by the Secretary of the Navy Application December 22, 1949, Serial No. 134,524

3 Claims. (Cl. 16—82)

This invention relates to safety devices, and more particularly to a safety device for restricting relative movement between two structures.

The safety device referred to herein is particularly useful with equipment which is freely slidable in drawer-like fashion within a cabinet or other suitable support, and arranged for withdrawal therefrom for convenience in inspecting or servicing. The safety device is especially useful with radio equipment for guarding against complete withdrawal or dislodging of the equipment from its support except when it is intended to do so, as, for example, on ships where the roll of the ship might easily cause a radio chassis to slide out of its rack or support.

It is the primary object of my present invention to provide a safety device to restrict relative movement between two structures which is positive in action and can be applied to existing structures without too great alteration.

It is also an object of my present invention to provide a locking device for two structures which will permit freedom of movement of one structure with respect to the other in one direction but which will restrict movement in the opposite direction.

It is a further object of my present invention to provide a safety device for a radio chassis which will prevent complete withdrawal of the radio chassis from its support except upon voluntary release of the safety device.

It is another object of my present invention to provide a safety device for radio equipment which is simple and easy to construct and which is substantially automatic in operation and requires only a simple manual operation to release.

In accordance with one form of my present invention, the safety device for restricting relative movement between a stationary member and a movable member, wherein the movable member is supported by and is freely slidable within the stationary member, comprises a pawl and latch respectively mounted on the stationary and movable members. The pawl is pivotally mounted adjacent one of its ends for rotation on an axis disposed on the pawl supporting member and is biased toward the other member. The latch is disposed on the other member in a position to engage the pawl when the movable member is partially withdrawn to an open position with respect to the stationary member. A cam surface is provided on the pawl for urging the latch into locking engagement therewith, and shoulders are provided respectively on the pawl and latch for locking the two together and preventing their being easily disengaged in the event the movable member is pulled from the support member with such a force as might cause the pawl and latch to swing clear of each other. The pawl is further provided with two other cam surfaces which are angularly related to each other and face the adjacent side of the other member for moving the pawl clear of the path of the other member in all positions except the open, locked position of the two members when the pawl and latch are engaged. Release means is provided on one of the members for preventing engagement of the lock and pawl when it is desired to completely separate the movable member from the stationary member.

The novel features of my present invention, as well as additional objects and advantages thereof, will be better understood from the following detailed description of a single embodiment thereof when read in connection with the accompanying drawing in which, Figure 1 is a perspective view, partly broken away, of one form of safety device in accordance with my present invention, the device being shown applied to two members one of which is freely slidable within the other, and the members being shown in a closed position, Figure 2 is a view similar to Figure 1 with portions thereof broken away and showing the members in a partly open, or withdrawn, position, Figure 3 is a view similar to Figure 2 showing the safety device released for effecting complete separation of the two members, and Figure 4 is a top plan view, partly broken away, of the pawl and its supporting bracket.

Referring more particularly to the drawing, wherein similar reference characters designate corresponding parts throughout, I have shown in detail, one of a pair of like safety devices, each comprising an elongated pawl 1 and latch 3 disposed, respectively, on a stationary structure or member 5 and a movable structure or member 7. The stationary and movable structures 5, 7 may comprise, for example, a cabinet or rack and a radio chassis, respectively. The movable structure 7 is freely slidable within the stationary structure 5 in drawer-like fashion, being supported on a pair of tracks 9 disposed respectively, on opposite sides of the stationary structure 5.

Each pawl 1 is mounted adjacent one end 11 thereof for pivotal movement about a vertical axis or pivot member 13 carried by a bracket 15. The pawls 1 and brackets 15 are mounted on opposite sides 17 of the stationary member 5 and are disposed in spaced relation thereto by a block 19. Screws or bolts 21, or other suitable fastening means are provided for securing the bracket 15 and block 19 to the sides 17 of the stationary member.

The end 23 of each pawl 1 which is opposite to the pivoted end 11 comprises a free end which is directed toward the back 25 of the stationary member 5 and is biased inwardly toward the adjacent side 27 of the movable member 7 by a torsion spring 29 disposed around the pivot member 13. The pawl 1 is provided with a pair of angularly related cam surfaces 31, 33 facing the adjacent side of the movable member 7 for moving the pawl 1 out of the path of travel of the movable member in a manner more particularly described below. One of the pair of cam surfaces 31, 33 therein designated as a first cam surface 31, is angularly disposed with respect to the adjacent side 27 of the movable member 7, and extends from adjacent the free end 23 of the pawl 1. The other cam surface 33, herein designated as a second cam surface, is also angularly disposed with respect to the other member's adjacent side 27.

The pawl 1 is cut-away to provide a latch receiving opening or recess 35 disposed inwardly from the cam surface 31 and remote from the free end 23 and the pivoted end 11. A shoulder 37 extends over the opening 35 in a direction toward the free end 23 and comprises a catch for the latch 3. The vertical surface 39 of the shoulder 37 extends slantingly from the cam surface 31 across the pawl 1 and remote from the free end 23 and the pivoted end 11 of the pawl. From the cam surface 31, this shoulder surface 39 slants in a direction toward the pivoted end 11 of the pawl 1 and provides a third cam surface for influencing the latch 3 into locking engagement with the shoulder 37. The bracket 15 has a vertical side portion 41 against which the vertical side portion 43 of the pawl 1 adjacent to the pivot member 13 abuts to provide a stop for the pawl 1 to limit pivotal movement of the pawl in the direction of bias for alignment of the pawl opening 35 and the shoulder 37 with the latch 3.

Each latch 3 comprises a bar which is pivotally mounted intermediate the ends thereof on a horizontal axis or pivot member 45 supported by the side 27 of the movable member 7. The end 47 of each latch 3 which is disposed forwardly of the pivot member 45 is provided with a shoulder 49 extending inwardly through an opening 51 provided in the sides 27 and comprises a manually operable handle for conditioning the pawls 1 and latches 3 to avoid engagement of the pawls with the latches upon separation of the movable member 7 from the stationary member 5. The opposite end 53 of each latch 3 terminates in a depending latch engaging portion 55 having a shoulder 57 on the bottom thereof which extends towards the pivot member 45 and forms a hook-like member for engaging the shoulder 37 of the pawl 1 in the manner shown in Figure 2 of the drawing. Each latch 3 is biased by a spring 59 attached to the side 27, to a normal, horizontal, locking position for engaging the pawl 1 upon withdrawal of the slidable member 7. Stops 61 are provided on the sides 27 for limiting the pivotal movement of the latches 3 in the direction of bias. A pawl receiving opening 63 is disposed in each side 27 opposite to the hook end 53 of each latch 3.

The cam surfaces 31, 33 extend beyond the plane in which the vertical side 41 of each bracket 15 is disposed so that each pawl normally engages the associated side 27 of the movable member 7 in response to the spring 29 when the movable member 7 is mounted within the stationary member 5. The locations of the pawls 1 and latches 3 on their respective members 5, 7 depend upon the extent to which the movable member 7 is intended to be withdrawn from the stationary member 5 without completely separating the two members. As shown in the drawing, the latch hook end 53 and the pawl receiving opening 63 are disposed adjacent to the rear of the movable member 7, and the pawl 1 is disposed adjacent to the front of the stationary member 5 so that the movable member may be substantially entirely withdrawn from the stationary member and normally locked against separation from the stationary member. When the movable member 7 is installed in the stationary member 5, the rear corners 65 of the movable member will engage the second cam surfaces 33 of the pawls 1 and force the pawls outwardly from the path of the movable member 7. As the member 7 continues its inward movement, the depending portions 55 of the latches 3 and the remainder of the sides 27 will continue to hold the pawls 1 in their outward positions. Thus, the movable member 7 is permitted freedom of movement in the inward direction so that it may be inserted into the stationary member 5 as far as desired and to a closed position, being limited only by the depth of the stationary member, as shown more particularly in Figure 1 of the drawing.

When it is desired to withdraw the movable member 7 from its closed position within the stationary member 5, the pawls 1 will ride along the outer surfaces of the sides 27 until the pawl receiving openings 63 are opposite the pawls 1, at which point the pawls will be biased into the openings 63. Further withdrawal of the movable member 7 will cause the latch shoulders 57 to engage with the pawl shoulders 37, thereby locking the movable member against any further withdrawal from the stationary member 5, as shown more particularly in Figure 2 of the drawing. If it is desired to entirely withdraw the movable member 7 from the stationary member 5, the movable member 7 need only be inserted slightly into the stationary member 5 from its partly withdrawn, locked position. The latch handles 49, which extend through the openings 51, may then be pressed downwardly, in the direction shown by the arrow 67 in Figure 3, an amount sufficient to raise the hook ends 53 out of alignment with the pawls 1 thereby to avoid engagement of the hook ends 53 with the pawls 1. The movable member 7 may then be withdrawn entirely from the stationary member 5 since the first cam surfaces 31 will engage the edges 69 of the pawl receiving openings 63 and move the pawls 1 to one side and out of the path of the sides 27.

The effectiveness of the locking action of the pawls 1 with the latches 3 is insured by the vertical surfaces 39 of the pawl shoulders 37 which provide cam surfaces tending to force the latch shoulders 57 inwardly into the latch receiving openings 35. Thus, even if the member 7 is pulled out suddenly, the locking action described will be insured. In addition thereto, the latch shoulders 57 engage underneath the pawl shoulders 37 to prevent any upward movement of the latches 3. Thus, displacement of the pawls 1 or latches 3, one with the other, which otherwise might occur as the result of impact between the latches and pawls, should the movable member 7 be withdrawn by excessive force, is thereby prevented. In many instances, the spacing between outer member 5 and the inner member 7 may be very small. In such cases, a fixed, relatively thin complementary member for the latch would, in all probability, be very uncertain in its action. The pivoting action of the pawl 1 into the opening 63 provides a positive locking action.

While the above-described safety devices are effective as a pair of units mounted on opposite sides of a drawer and cabinet, as shown in the drawing, it will be clear that a single unit mounted on only one side of the movable member and the cabinet will ordinarily suffice. It will also be apparent to those persons skilled in the art that while the safety device has been shown and described as limiting withdrawal of the movable member from a stationary member, it also may be employed to limit any movement as between two members. It will further be recognized that various changes and modifications are possible within the spirit of my present invention. Therefore, I desire that the particular form of my present invention described herein shall be considered as illustrative and not as limiting.

What is claimed is:

1. A safety device for restricting relative movement between a movable and stationary member wherein said movable member is mounted for slidable movement within said stationary member, said safety device comprising an elongated pawl pivotally mounted at one end about an axis and on said stationary member with the other end freely disposed, said pawl having a shoulder which overhangs and defines a latch recess, said recess extending from an edge nearest said movable member partly across said pawl, said shoulder extending from an edge nearest said movable member across said pawl and slanting toward said pivoted end, latch means pivotally mounted about an axis and on said movable member, said pawl axis and said latch axis being perpendicular with respect to each other, said latch means having a hook-like portion, said hook-like portion being engageable with said latch recess on said pawl, and means for biasing said latch means about its axis toward engagement with said pawl, said latch means cooperating with said slantingly disposed shoulder on said pawl upon engagement therewith to maintain said pawl in a position to effect positive locking of said members.

2. The invention as set forth in claim 1 wherein said pawl is provided with a first and second surface, said surfaces being angularly related with respect to each other and to an adjacent side of said movable member, said adjacent side of said movable member being provided with an opening into which said pawl may partially move upon engagement of said latch, said angularly related surfaces being arranged to cooperate with corresponding edges of said opening to cam said pawl out of said opening upon movement of said movable member from its latched position.

3. The invention as set forth in claim 2 wherein said latch means includes manually operable means for avoiding engagement of said latch with said pawl whereby said movable member may be intentionally removed from said stationary member.

References Cited in the file of this patent

UNITED STATES PATENTS

| Number | Name | Date |
|---|---|---|
| 729,980 | Vordemfelde | June 2, 1903 |
| 1,193,000 | Edwards | Aug. 1, 1916 |
| 1,642,612 | Haarberg | Sept. 13, 1927 |
| 2,041,065 | Hemphill | May 19, 1936 |
| 2,113,747 | Roedding | Apr. 12, 1938 |
| 2,430,141 | Reeves | Nov. 4, 1947 |
| 2,448,765 | Browning | Sept. 7, 1948 |
| 2,498,243 | Brinker et al. | Feb. 21, 1950 |